United States Patent [19]

Hatano et al.

[11] Patent Number: 5,245,453
[45] Date of Patent: Sep. 14, 1993

[54] LIQUID CRYSTAL MODULATOR HAVING A PHOTOCONDUCTOR AND/OR A DIELECTRIC MIRROR COMPOSED OF HYDROGENATED AMORPHOUS SILICON CARBIDE

[75] Inventors: Akitsugu Hatano; Naofumi Kimura; Sayuri Fujiwara, all of Nara, Japan

[73] Assignee: Sharp Kabushiki Kaisha, Osaka, Japan

[21] Appl. No.: 902,417

[22] Filed: Jun. 19, 1992

Related U.S. Application Data

[63] Continuation of Ser. No. 564,718, Aug. 8, 1990, abandoned.

[30] Foreign Application Priority Data

Aug. 11, 1989 [JP] Japan .................................. 1-208514
Oct. 2, 1989 [JP] Japan .................................. 1-257267
Jun. 7, 1990 [JP] Japan .................................. 2-149273

[51] Int. Cl.⁵ ...................... G02F 1/1335; G02F 1/135
[52] U.S. Cl. ...................................... 359/67; 359/71; 359/72
[58] Field of Search ............... 350/342, 331 R, 339 R; 359/71, 72, 67

[56] References Cited

U.S. PATENT DOCUMENTS

| | | | |
|---|---|---|---|
| 4,538,884 | 9/1985 | Masaki | 350/342 X |
| 4,687,723 | 8/1987 | Ohshima et al. | 430/84 |
| 4,762,397 | 8/1988 | Pepper | 350/331 R |
| 4,941,735 | 7/1990 | Moddel et al. | 350/342 |
| 5,011,624 | 4/1991 | Yamagishi et al. | 350/347 V |
| 5,084,777 | 1/1992 | Slobodin | 359/67 |
| 5,103,327 | 4/1992 | Hiria et al. | 359/93 X |
| 5,132,814 | 7/1992 | Ohkouchi et al. | 359/72 X |

FOREIGN PATENT DOCUMENTS

| | | |
|---|---|---|
| 2139537 | 1/1973 | France . |
| 59-81627 | 5/1984 | Japan . |
| 62-172758 | 7/1987 | Japan . |
| 63-253924 | 10/1988 | Japan . |
| 2-083524 | 3/1990 | Japan . |
| 3-5729 | 1/1991 | Japan . |

OTHER PUBLICATIONS

Takahashi et al., "High Speed Light Valve Using An Amorphous Silicon Photosensor and Feiroelectric Liquid Crystals" *Applied Physics Letters* vol. 51, No. 16, Oct. 19, 1987 pp. 1233–1235.

Moddel et al. "High Speed Binary Optically Addressed Spatial Light Modulator" Applied Physics Letters vol. 55, No. 6, Aug. 7, 1989 pp. 537–539.

Schlichting et al., in "Gmelin Handbook on Inorganic Chemistry" Supplement vol. B2, System No. 15, 1984, 8th edition, pp. 283–307.

D. Coates, I. C. Sage, W. A. Crossland and A. B. Davey, "Use of Optimised Chiral Smectic Liquid Crystals in Optical Processing", Tech. Rep. of Japan Display '89, 1989 pp. 176–178.

*Primary Examiner*—William L. Sikes
*Assistant Examiner*—Ron Trice
*Attorney, Agent, or Firm*—David G. Conlin; Robert F. O'Connell

[57] ABSTRACT

A liquid crystal display device of optical writing type has a first transparent substrate, a first transparent electrode formed on the first transparent substrate, and a photoconductive layer formed on the first transparent electrode and including hydrogenated amorphous silicon carbide ($a-Si_{1-x}C_x$:H). The display device also has a second transparent substrate, a second transparent electrode formed on the second transparent substrate, and a liquid crystal layer disposed between the photoconductive layer and the second transparent electrode. The dielectric mirror can be made of alternating layers of hydrogenated amorphous silicon carbide (a-SiC:H) with different silicon to carbon ratios.

18 Claims, 5 Drawing Sheets

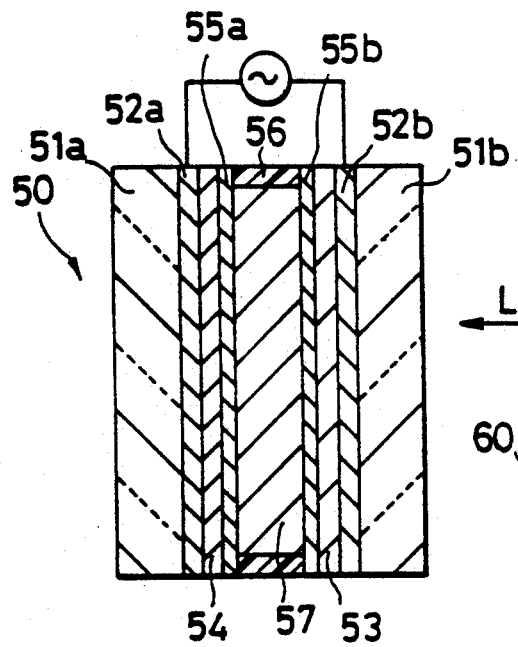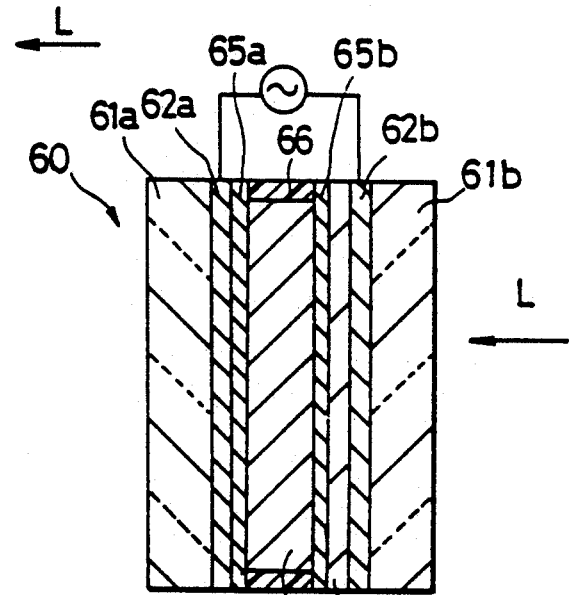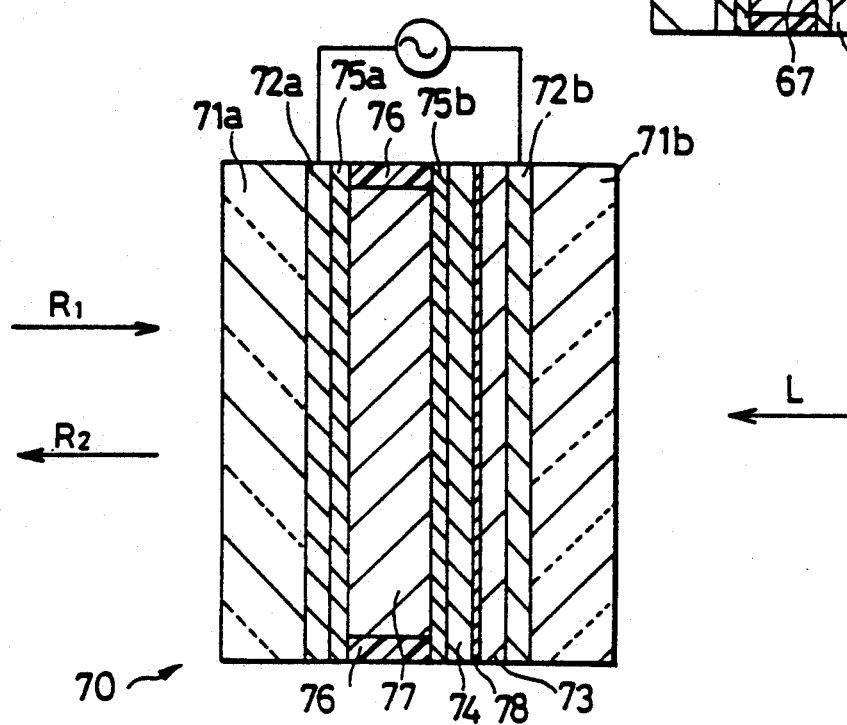

LIQUID CRYSTAL MODULATOR HAVING A PHOTOCONDUCTOR AND/OR A DIELECTRIC MIRROR COMPOSED OF HYDROGENATED AMORPHOUS SILICON CARBIDE

This is a continuation of copending application Ser. No. 07/564,718 filed on Aug. 8, 1990, now abandoned.

BACKGROUND OF THE INVENTION

1. Field of the Invention

The present invention relates to a liquid crystal display device of optical writing type.

2. Description of the Related Art

As one of various kinds of liquid crystal display devices, there is a liquid crystal display device of optical writing type, which is typically used as a liquid crystal light valve.

Such a liquid crystal display device of optical writing type includes a pair of glass substrates facing each other.

Each of the substrates is provided with a transparent electrode on the facing side.

On the first transparent electrode, there is formed a photoconductive layer. The photoconductive layer is made from hydrogenated amorphous silicon (a−Si:H).

On the photoconductive layer, there is formed a dielectric mirror layer. The dielectric mirror layer is made from multiple layer films composed of Si (silicon)/$SiO_2$ (silicon dioxide), $TiO_2$ (titanium dioxide)/$SiO_2$, or ZnS (zinc sulfide)/MgF (magnesium fluoride), etc.

Between the photoconductive layer and the dielectric mirror layer, there may be interposed a light absorbing layer. The light absorbing layer is made from a patternized thin film including C (carbon), Ag (silver) and so on.

A pair of orientation films are formed on the dielectric mirror layer and the second transparent electrode. A liquid crystal layer is disposed between the orientation films and sealed by use of a sealing member which functions as a spacer and attaches the glass substrates to each other.

Such a liquid crystal display device is used as a liquid crystal light valve, for example, for use in a liquid crystal projector.

In the operation of the liquid crystal display device as a light valve, an alternating electrical voltage is applied across the transparent electrodes. Then, a laser beam scans the substrate from the side of the photoconductive layer so as to change the impedance of the photoconductive layer, change the voltage applied to the liquid crystal layer, and change each molecular orientation of the voltage applied area of the liquid crystal layer. Thus, an image due to the impedance differences of the photoconductive layer is achieved on the liquid crystal layer, depending on the condition of the photoconductive layer, i.e., whether it is in either a dark condition (where the laser beam is applied) or a bright condition (where the laser beam is not applied).

In case of utilizing such a light valve for the liquid crystal projector, the written image on the liquid crystal layer is projected onto a screen by use of a projection light from a light source.

As an operation mode in such a display operation, there are a TN (twisted nematic) mode, a HFE (hybrid field effect) mode, a GH (guest host) mode, a phase transition mode and so on.

In this kind of liquid crystal display device of optical writing type, since the hydrogenated amorphous silicon layer is used as the photoconductive layer, the conductivity of the photoconductive layer in the dark condition is of the same order as the conductivity of the liquid crystal layer, which is about $10^{-10}$ to $10^{-12}$ S/cm. The impedance of the photoconductive layer and the liquid crystal layer are in a same order. Accordingly, on one hand, in the dark condition, a certain amount of the voltage is applied to the liquid crystal layer. On the other hand, in the bright condition, the impedance of the photoconductive layer is reduced to be lower than the impedance of the liquid crystal layer, so that substantially the entire voltage is applied to the liquid crystal layer. In this structure, the ratio referred to as the ON/OFF voltage ratio, which is the ratio of the voltage applied to the liquid crystal in the area where light is applied to the voltage applied to the liquid crystal in the area where light is not applied, is lowered because a certain amount of the voltage is applied to the liquid crystal layer even in the dark condition, resulting in an increase of the OFF voltage. Consequently, a first problem areas in this kind of liquid crystal display device is that a high contrast image can not be obtained.

In this kind of liquid crystal display device, in the case wherein a light absorbing layer is utilized, since the light absorbing layer is formed from a metal film including C, Ag, etc., and since the dielectric mirror layer is made from multiple layers of $Si/SiO_2$, $TiO_2/SiO_2$, ZnS/MgF, etc. as described above, the resolution of the image liquid crystal display device is rather poor, giving rise to a second problem in this kind of display device.

In addition, the kind of liquid crystal display device has a third problem, that is, since the adhesion ability between the metal film including C, Ag, etc. and the hydrogenated amorphous silicon is poor, the light absorbing layer and the photoconductive layer are easily detached from each other.

Further, the manufacturing process of the dielectric mirror layer is rather difficult and complicated, since the production of the multiple layer structure requires repeating two different processes by turns, i.e. changing the material and forming each film from the changed material in each step, giving rise to a fourth problem.

SUMMARY OF THE INVENTION

It is therefore a first object of the present invention to provide a liquid crystal display device of optical writing type which can create a high contrast image.

It is a second object of the present invention to provide a liquid crystal display device of optical writing type which can obtain a high image resolution According to the present invention, the first object can be achieved by a first liquid crystal display device of optical writing type having a first transparent substrate, a first transparent electrode formed on the first transparent substrate, and a photoconductive layer which is formed on the first transparent electrode and includes hydrogenated amorphous silicon carbide (a—$Si_{1-x}C_x$:H). The first display device also has a second transparent substrate, a second transparent electrode formed on the second transparent substrate, and a liquid crystal layer disposed between the photoconductive layer and the second transparent electrode.

According to the present invention, the second object can be achieved by a second liquid crystal display device of optical writing type having a first transparent substrate, a first transparent electrode formed on the first transparent substrate, a photoconductive layer formed on the first transparent electrode, a light absorbing layer formed on the photoconductive layer, and a dielectric mirror layer which is formed on the light absorbing layer and includes amorphous silicon. The second display device also has a second transparent substrate, a second transparent electrode formed on the second transparent substrate, and a liquid crystal layer disposed between the dielectric mirror layer and the second transparent electrode.

According to the present invention, the second object can be also achieved by a third liquid crystal display device of optical writing type having a first transparent substrate, a first transparent electrode formed on the first transparent substrate, a photoconductive layer formed on the first transparent electrode, a light absorbing layer which is formed on the photoconductive layer and includes amorphous silicon, and a dielectric mirror layer formed on the light absorbing layer. The third display device also has a second transparent substrate, a second transparent electrode formed on the second transparent substrate, and a liquid crystal layer disposed between the dielectric mirror layer and the second transparent electrode.

In the first display device, the photoconductive layer includes hydrogenated amorphous silicon carbide (a—$Si_{1-x}C_x$:H). Such a photoconductive layer can be formed, for example, by means of a CVD method, a sputtering method, or a vacuum deposition method by use of material gas including silane ($SiH_4$), hydrogen ($H_2$), and methane ($CH_4$). The conductivities of the photoconductive layer in dark and bright conditions can be determined to desirable values by controlling a gas flow volume ratio of the material gas.

Thus, the impedance of the photoconductive layer in the dark condition is made higher than the impedance of the liquid crystal layer. On the contrary, the impedance of the photoconductive layer in the bright condition is made lower than the impedance of the liquid crystal layer. Accordingly, when an voltage is supplied across the first and the second transparent electrodes, in its operation, a small part of the voltage is applied to a portion of the liquid crystal corresponding to a portion of the photoconductive layer in the dark condition. On the other hand, most of the voltage is applied to a portion of the liquid crystal layer corresponding to a portion of the photoconductive layer in the bright condition. Consequently, a large value of the ON/OFF voltage ratio can be achieved, and a great change in optical condition of the liquid crystal layer can be achieved. Thus, by scanning the photoconductive layer by a light for optical writing such as a laser beam, a high contrast display image can be produced by the first display device of the present invention.

In the second display device, the dielectric mirror layer includes amorphous silicon such as hydrogenated amorphous silicon carbide (a—$Si_{1-x}C_x$:H). Such a dielectric mirror layer can be formed, for example, by means of a CVD method, a sputtering method, or a vacuum deposition method by use of material gas including silane ($SiH_4$), hydrogen ($H_2$), and methane ($CH_4$). The refractive index of the dielectric mirror layer can be determined to desirable values by controlling a gas flow volume ratio of the material gas. A good characteristic of reflection can be obtained by the dielectric mirror layer.

Thus, when a reading light for image display, such as a light from a light source, is inputted and transmitted through the liquid crystal layer, the transmitted light is precisely and efficiently reflected on the dielectric mirror layer, is transmitted again through the liquid crystal layer, and is, for example, projected onto a screen. Accordingly, the second display device can obtain a high resolution in image.

In the third display device, the light absorbing layer includes amorphous silicon such as hydrogenated amorphous silicon tin (a—SiSn:H). Such a light absorbing layer can be formed, for example, from material gas including silane ($SiH_4$) and tetramethyltin ($Sn(CH_3)_4$) by means of a CVD method. A good characteristic of light absorption can be obtained by the light absorbing layer.

Thus, when a light for optical writing, such as a laser beam, is input to the photoconductive layer and a portion of the light passes through the photoconductive layer, the passing portion of the light is effectively absorbed by the light absorbing layer and is not reflected by the dielectric mirror layer, which reflection would otherwise cause a degration of the image resolution on the photoconductive layer by being input again to the photoconductive layer as a noise. Accordingly, the third display device can obtain a high resolution in image.

Further objects and advantages of the present invention will be apparent from the following description of the preferred embodiment of the invention as illustrated in the accompanying drawings.

BRIEF DESCRIPTION OF THE DRAWINGS

FIG. 5 is a schematic cross sectional view showing a third embodiment of the present invention;

FIG. 6 is a schematic cross sectional view showing a fourth embodiment of the present invention;

FIG. 7 is a schematic cross sectional view showing a fifth embodiment of the present invention;

DETAILED DESCRIPTION OF THE PREFERRED EMBODIMENT

A preferred embodiment of the present invention will be described below with reference to the accompanying drawings.

Figure 1:
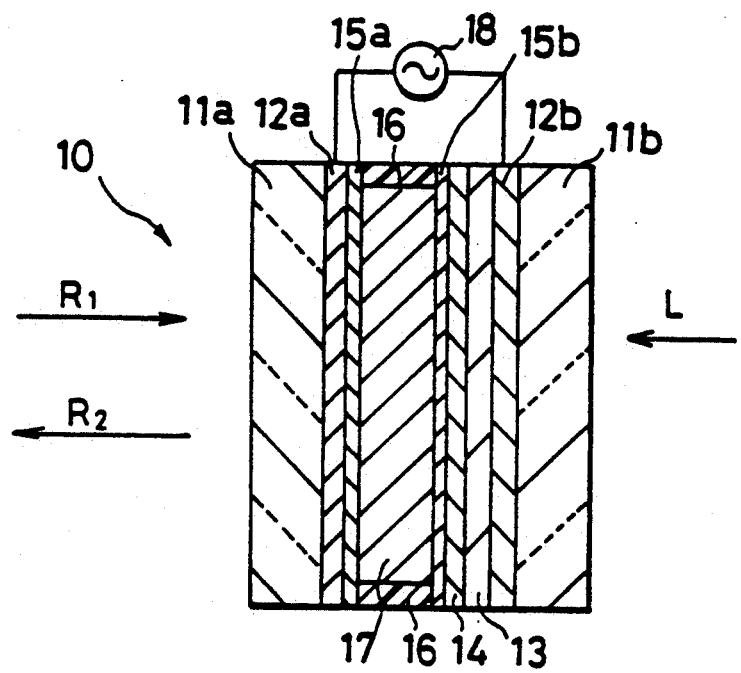
FIG. 1 is a schematic cross sectional view showing a first embodiment of the present invention.

FIG. 1 shows a liquid crystal display device of a first embodiment according to the present invention.

In FIG. 1, a liquid crystal display device 10 of optical writing type is provided with glass substrates 11a and 11b.

Transparent electrodes 12a and 12b are disposed on the substrates 11a and 11b respectively. Each of the transparent electrodes 12a and 12b has a multiple layer structure including layers of ITO (indium tin oxide) transparent conductive films and layers of $SnO_2$ (tin oxide) transparent conductive films, and is formed by means of a sputtering technique.

A photoconductive layer 13 is disposed on the transparent electrode 12b. The photoconductive layer 13 is made of hydrogenated amorphous silicon carbide (a—$Si_{1-x}C_x$:H) so that the impedance of the photoconductive layer 13 changes upon the application of light. The photoconductive layer 13 is formed by means of a plasma CVD (chemical vapour deposition) method using $SiH_4$ (silane) gas, $H_2$ (hydrogen) gas, and $CH_4$ (methane) gas as material gases. The thickness of the photoconductive layer 13 is about 3 $\mu$m.

A dielectric mirror layer 14 is disposed on the photoconductive layer 13. The dielectric mirror layer 14 has a multiple layer structure, including silicon films and silicon dioxide films, and is formed by means of a sputtering technique.

Orientation films 15a and 15b are disposed on the transparent electrode 12a and the dielectric mirror layer 14 respectively. Each of the orientation films 15a and 15b is made of polyamide film which is formed by means of a spin coating technique and is applied with a molecular orientation process by means of a rubbing technique.

The substrate 11a and 11b are attached together by a sealing member 16 which also serves as a spacer prescribing the distance between the substrates 11a and 11b.

A liquid crystal layer 17 is disposed between the orientation films 15a and 15b. The liquid crystal layer 17 is formed by pouring and sealing a composite nematic liquid crystal, which is made by adding chiral material (S811: made by Merck Co., Inc.) by about 10 weight % to nematic liquid crystal in the phenylcyclohexanone family. The thickness of the cell of the liquid crystal is about 6 $\mu$m.

A phase transition mode is used as the display mode of the display device 10.

The operation of the display device will be explained below.

The conductivity of the hydrogenated amorphous silicon carbide as the photoconductive layer 13 changes in a great degree depending on the molar composition X of the carbon in the hydrogenated amorphous silicon carbide (a—$Si_{1-x}C_x$:H).

Figure 2:
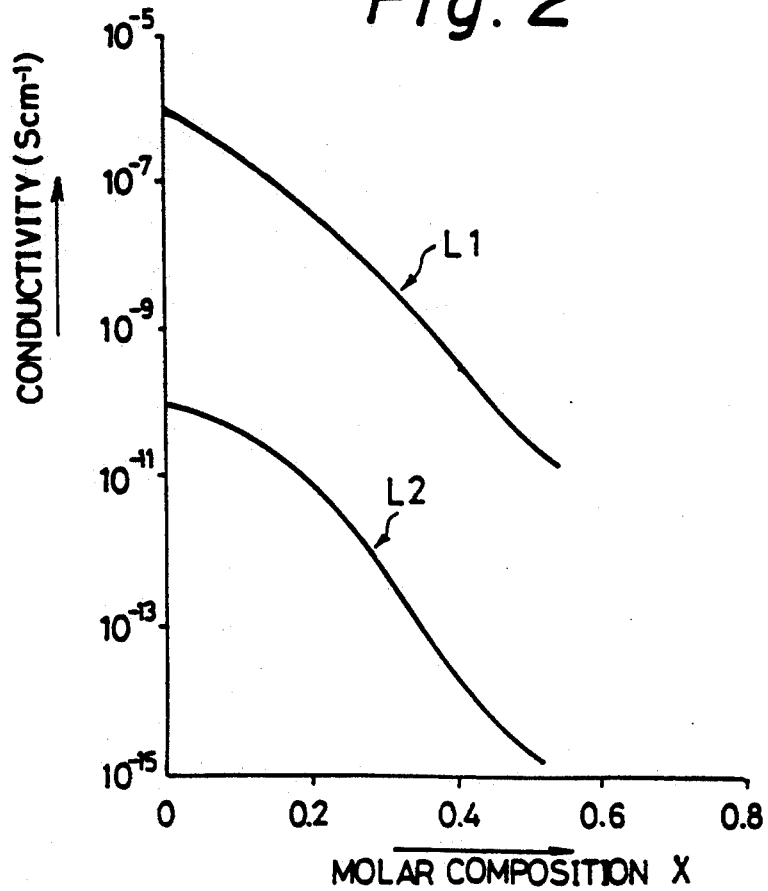
FIG. 2 is a graph showing a relationship between the molar composition and the conductivity of hydrogenated amorphous silicon carbide.

FIG. 2 shows a graph showing a relationship between the molar composition X and the conductivity of the hydrogenated amorphous silicon carbide (a—$Si_{1-x}C_x$:H).

In FIG. 2, the line L1 shows a conductivity in the bright condition, and the line L2 shows a conductivity in the dark condition. As clearly shown from FIG. 2, as the composition X increases, the conductivities in both bright and dark conditions decrease.

In order to selectively apply and not apply the electric voltage to the liquid crystal layer 17 by the difference in the condition of the photoconductive layer 13 between the dark condition and the bright condition, it is required to adjust the conductivities of the liquid crystal layer 17 and the photoconductive layer 13. Namely, it is preferable to make the conductivity in the dark condition of the photoconductive layer 13 lower than the conductivity of the liquid crystal layer 17 and to make the conductivity in the bright condition of the photoconductive layer 17 higher than the conductivity of the liquid crystal layer 17.

An example is explained hereinbelow, which uses a liquid crystal having a conductivity of $10^{-10}$ S/cm for the liquid crystal layer 17, since the conductivity of the liquid crystal layer 17 is within a range of about $10^{-10}$ to $10^{-12}$ S/cm as mentioned before.

In order to make the conductivity in the dark condition of the photoconductive layer 13 lower than $10^{-10}$ S/cm which is the conductivity of the liquid crystal layer 17, the composition X is to be higher than about 0.05 with reference to the line L2 of FIG. 2.

On the other hand, in order to make the conductivity in the bright condition of the photoconductive layer 13 higher than $10^{-10}$ S/cm, the composition X is to be lower than about 0.5 with reference to the line L1 of FIG. 2.

Accordingly, the composition X is preferably set in a range of about 0.05 to 0.5. If the composition X is not in this range, a high contrast image can not be achieved because the ON/OFF voltage ratio is made small. Further, in order to achieve a higher contrast image, the composition X is set so that the conductivity in the dark condition of the photoconductive layer 13 is reduced while the conductivity in the bright condition is increased.

If a liquid crystal of a conductivity different from $10^{-10}$ S/cm is used for the liquid crystal layer 17, the composition X can be determined in a same way as explained above.

Figure 3:
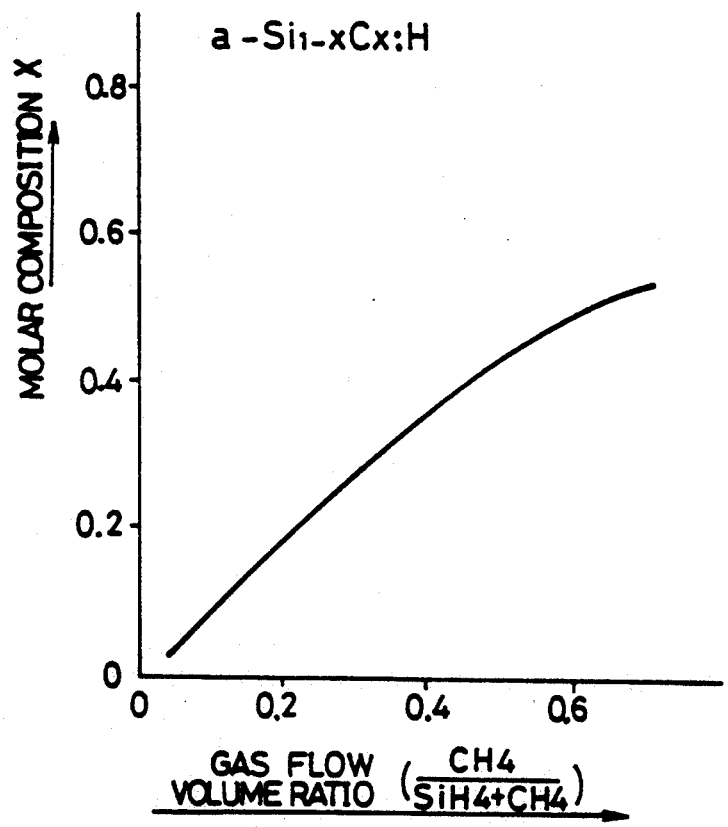
FIG. 3 is a graph showing a relationship between the gas flow volume ratio of the material gas and the composition of the produced hydrogenated amorphous silicon carbide in its production process.

The composition X can be adjusted by the gas flow volume ratio of the material gases, i.e. the $SiH_4$, $H_2$, $CH_4$ gases. FIG. 3 is a graph showing the relationship between the gas flow volume ratio $CH_4/(SiH_4+CH_4)$ and the composition X.

In FIG. 3, it is shown that the composition X monotonously changes as the gas flow volume ratio changes. Thus, it is possible to obtain the hydrogenated amorphous silicon carbide having a desirable composition X by adjusting the gas flow volume ratio.

An operation of a thus constructed display device 10 will be explained with reference to FIG. 1 hereinbelow.

In the operation of the display device 10 as a light valve, an alternating electrical voltage is applied across the transparent electrodes 12a and 12b by an alternating voltage source 18. Then, a laser beam L scans the substrate 11b so as to change the impedance of the photoconductive layer 13, change the voltage applied to the liquid crystal layer 17, and change each molecular orientation in the voltage applied area of the liquid crystal layer 17 to a specific direction so as to change the polarization direction of an incident reading light $R_1$. Namely, in the area of the photoconductive layer 13 where the laser beam L is applied, the impedance of the photoconductive layer 13 is decreased and substantially the entire voltage due to the voltage source 18 is applied to the liquid crystal layer 17, while in the area of the photoconductive layer 13 where the laser beam L is not applied, the impedance does not change and thus the voltage due to the voltage source 18 is not applied to the liquid crystal layer 17. Thus, an image due to the impedance differences is produced on the liquid crystal layer 17, depending on the condition of the photoconductive layer 17 which is in either the dark condition or the bright condition.

While such an image is formed on the liquid crystal layer 17, the light $R_1$ is incident on the display device 10. The light $R_1$ is transmitted through the liquid crystal layer 17 and reflected by the dielectric mirror layer 14 as a reflected reading light $R_2$. The light $R_2$ is then outputted from the display device 10.

The operational principle of the display device 10 will be explained in more detail with reference to a display apparatus including the display device 10 hereinbelow.

Figure 4:
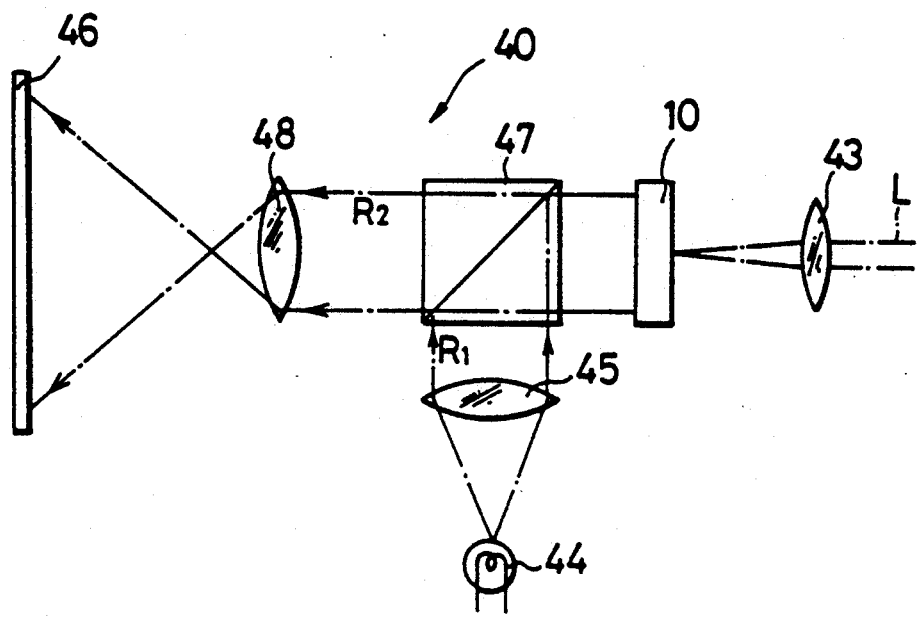
FIG. 4 is a schematic plan view showing a second embodiment utilizing the first embodiment of the present invention.

FIG. 4 shows a liquid crystal display apparatus 40, as a second embodiment of the present invention, utilizing the above described display device 10 as a light valve for light modulation.

In the operation of the display apparatus 40, an image is formed on the display device 10 by applying the laser beam L through a lens 43. The light $R_1$ from the lamp 44 is incident to the display device 10 through the lens 45 and a polarization beam splitter 47. Then, the light $R_1$ is reflected by the dielectric mirror layer of the display device 10.

Then, a portion of this reflected light passing through each portion of the liquid crystal layer of the display device 10, which molecular orientation condition is changed by the laser beam L, is changed in its polarization direction due to the electro optical effect of the liquid crystal layer 17. Thus, this portion of reflected light from the display device 10 can pass through the beam splitter 47 as the light $R_2$ of FIG. 4 toward a lens 48.

On the other hand, another portion of the light $R_1$ passing through each portion of the liquid crystal layer, which molecular orientation is not changed by the laser beam L, is not changed in its polarization direction. Thus, this other portion of reflected light can not pass through the beam splitter 47 toward the lens 48.

The light $R_2$ from the beam splitter 47 is magnified by the lens 48 and then projected onto a screen 46 as the image corresponding to the image formed on the display device 10.

As a material gas of carbon for forming the hydrogenated amorphous silicon carbide layer as the photoconductive layer 13, ethane, propane, butane, acetylene and so on, can be used other than the methane.

As a method of forming the hydrogenated amorphous silicon carbide layer as the photoconductive layer 13, the sputtering method, the heat CVD method, the light CVD method, ECR (electron cyclotron resonance) plasma method etc., can be utilized other than the plasma CVD method.

The photoconductive layer 13 may be formed to include other materials such as oxygen and nitrogen.

FIG. 5 shows a liquid crystal display device of a third embodiment according to the present invention.

In FIG. 5, a liquid crystal display device 50 of optical writing type is provided with glass substrates 51a and 51b. The display device 50 has a similar structure as the display device 10 of FIG. 1, except its structure is such that a dielectric mirror layer 54 is disposed on a left hand side of the liquid crystal 57 in FIG. 5 while the dielectric mirror layer 17 is disposed on a right side of the liquid crystal 17 in FIG. 1.

In the display device 50, transparent electrodes 52a and 52b are disposed on the substrates 51a and 51b, respectively. A photoconductive layer 53 is disposed on the transparent electrode 52b. The dielectric mirror layer 54 is disposed on the transparent electrode 52a. Orientation films 55a and 55b are disposed on the dielectric mirror layer 54 and the photoconductive layer 53, respectively. The substrates 51a and 51b are attached together by a sealing member 56. The liquid crystal layer 57 is disposed between the orientation films 55a and 55b.

In an operation of the display device 50, a laser beam L is incident to the photoconductive layer 53.

FIG. 6 shows a liquid crystal display device of a fourth embodiment according to the present invention.

In FIG. 6, a liquid crystal display device 60 of optical writing type is provided with glass substrates 61a and 61b. The display device 60 has a similar structure as the display device 10 of FIG. 1, except its structure is such that a dielectric mirror layer is omitted.

In the display device 60, transparent electrodes 62a and 62b are disposed on the substrates 61a and 61b respectively. A photoconductive layer 63 is disposed on the transparent electrode 62b. Orientation films 65a and 65b are disposed on the transparent electrode 62a and the photoconductive layer 63, respectively. The substrates 61a and 61b are attached together by a sealing member 66. The liquid crystal layer 67 is disposed between the orientation films 65a and 65b.

In an operation of the display device 60, a laser beam L incident to the photoconductive layer 63. The display device 60 can be utilized as a display of a transmissive type or for objects other than display.

FIG. 7 shows a liquid crystal display device of a fifth embodiment according to the present invention.

In FIG. 7, a liquid crystal display device 70 of optical writing type is provided with glass substrates 71a and 71b. The display device 70 has a similar structure as the display device 10 of FIG. 1, except its structure is such that a light absorbing layer 78 is disposed between a photoconductive layer 73 and a dielectric mirror layer 74. The composition of the photoconductive layer 73 and the composition of the dielectric mirror layer 74 are also different from those of the display device 10 of FIG. 1.

In the display device 70, transparent electrodes 72a and 72b are disposed on the substrates 71a and 71b, respectively.

The photoconductive layer 73 is disposed on the transparent electrode 72b. The photoconductive layer 73 is made from hydrogenated amorphous silicon (a-Si:H), and has a layer thickness of about 3 $\mu$m.

The light absorbing layer 78 is disposed on the photoconductive layer 73. The light absorbing layer 78 is made of hydrogenated amorphous silicon tin (a-SiSn:H), and has a layer thickness of about 0.2 $\mu$m. The light absorbing layer 78 prevents the laser beam L from reflecting at the dielectric mirror layer 74 and inputting again to the photoconductive layer 73.

Since the light absorbing layer 78 is made of hydrogenated amorphous silicon tin, its light absorbing ability is high. Thus, the resolution in image of the display device 70 can be increased by the existence of the light absorbing layer 78. In addition, the adhesion between the photoconductive layer 73 made of hydrogenated amorphous silicon and the light absorbing layer 78 is strong, and thus a detachment of those layers 73 and 78 from each other is prevented.

The dielectric mirror layer 74 is disposed on the light absorbing layer 78. The dielectric mirror layer 74 has a multiple layer structure including layers $1_1$ and layers $1_2$ which are alternatively layered as shown in FIG. 8.

Figure 8:
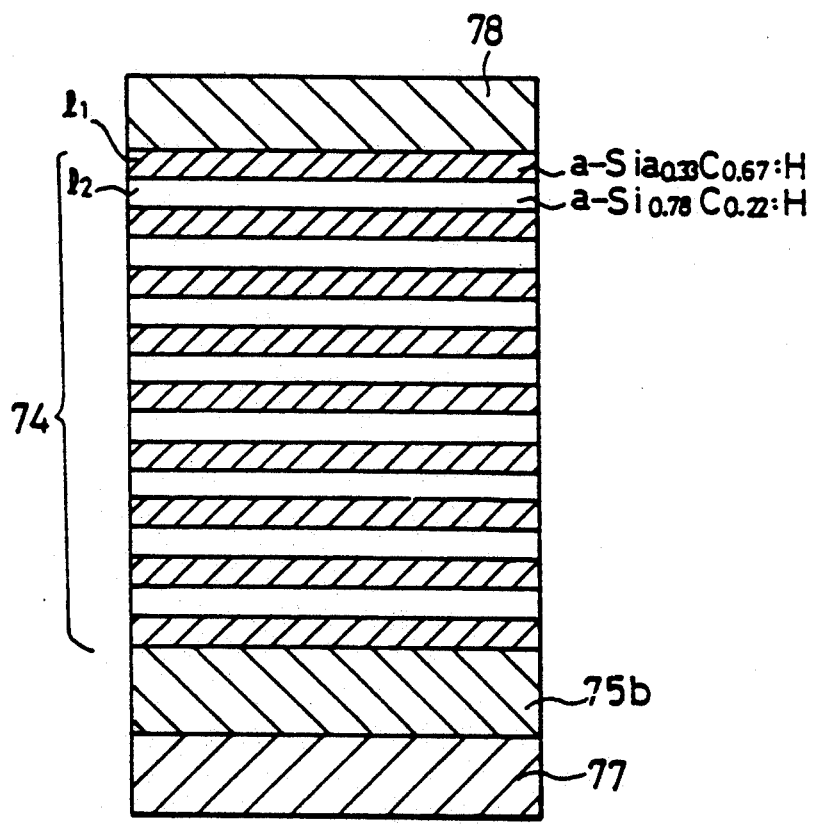
FIG. 8 is a schematic cross sectional view showing the multiple layer structure of the dielectric mirror layer of the fifth embodiment.

In FIG. 8, the layer $l_1$ is made of hydrogenated amorphous silicon carbide (a-Si$_{1-x}$C$_x$:H). The layer $l_2$ is also made of hydrogenated amorphous silicon carbide (a-Si$_{1-z}$C$_z$:H) with different composition (Z≠X). The dielectric mirror layer 74 consists of seventeen layers $l_1$ and $l_2$ and has a total layer thickness of about 1.3 μm. The dielectric mirror layer 74 thus constructed has a good reflecting capability and increases the image resolution of the display device 70. In addition, the dielectric mirror layer 74 thus constructed has an advantage in its simplified manufacturing process, since both of the layers $l_1$ and $l_2$ are made of same material, i.e. hydrogenated amorphous silicon carbide.

In FIG. 7, orientation films 75a and 75b are disposed on the transparent electrode 72a and the dielectric mirror layer 74. The substrates 71a and 71b are attached together by a sealing member 76. The liquid crystal layer 77 is disposed between the orientation films 75a and 75b.

The display device 70 is operated in a same manner as the display device 10 of FIG. 1, by use of the laser beam L, the reading light R$_1$ and the reflected light R$_2$. Thus, the explanation for the operation of the display device 70 is omitted.

A manufacturing procedure of the display device 70 will be explained below in sequence.

(A) Each of the transparent electrodes 72a and 72b is formed on the glass substrates 71a and 71b, respectively, by a sputtering technique. In this forming process, a ITO transparent conductive film and a SnO$_2$ transparent conductive film are alternatively formed so as to obtain the multiple layer structure.

(B) The photoconductive layer 73 is formed on the transparent electrode 72b by a plasma CVD method. In this forming process, SiH$_4$ gas and H$_2$ gas are used as material gases. The thickness of the photoconductive layer 73 is made about 3 μm.

(C) The light absorbing layer 78 is formed on the photoconductive layer 73 by a plasma CVD method. In this forming prosess, a composite gas of SiH$_4$ and tetramethyltin (Sn(CH$_3$)$_4$) is used as material gas. The gas flow volume ratio Sn(CH$_3$)$_4$/(SiH$_4$+Sn(CH$_3$)$_4$), that is, the ratio of Sn(CH$_3$)$_4$ to the sum of SiH$_4$ and Sn(CH$_3$)$_4$, can be varied within a range of 2.8 mol % to 4.9 mol %, and is preferably selected at about 4 mol %. The thickness of the light absorbing layer 78 is made about 0.2 μm.

(D) The dielectric mirror layer 74 is formed on the light absorbing layer 78 by a plasma CVD method. In this forming prosess, SiH$_4$ gas, H$_2$ gas and CH$_4$ gas are used as material gases. The layers $l_1$ and $l_2$ made of hydrogenated amorphous silicon carbide are alternatively formed by changing the gas flow volume ratio of those material gases as shown in FIG. 8. In a same manner as in the first embodiment explained with reference to FIG. 3, the molar compositions X and Z of the carbon in the hydrogenated amorphous silicon carbide (a−Si$_{1-x}$C$_x$:H) and −Si$_{1-z}$C$_z$:H) can be controlled by changing the gas flow volume ratio CH$_4$/(SiH$_4$+CH$_4$).

Figure 9:
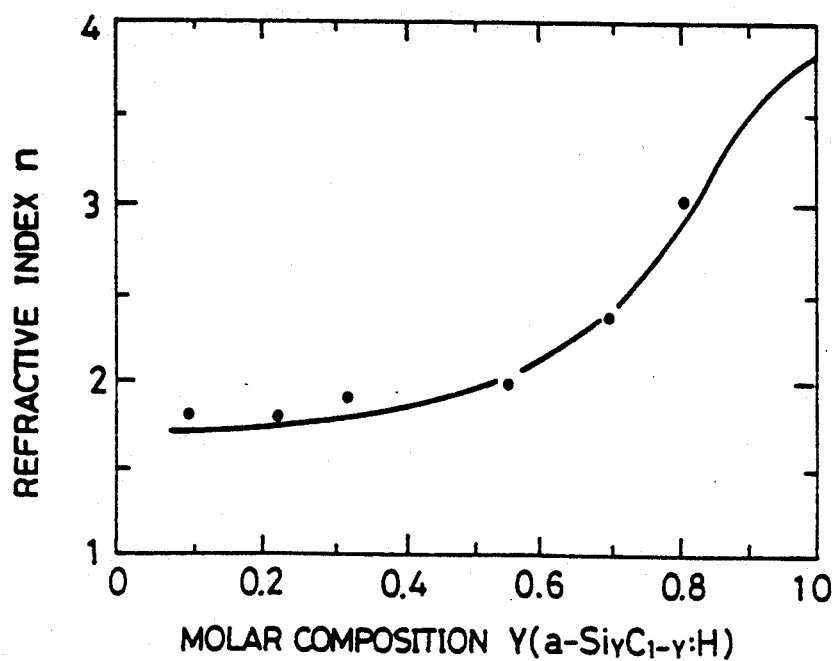
FIG. 9 is a graph showing a relationship between the molar composition and the refractive index of the hydrogenated amorphous silicon carbide.

FIG. 9 shows a relationship between the molar composition Y of the silicon in the hydrogenated amorphous silicon carbide (a−Si$_y$C$_{1-y}$:H) and the refractive index n of the hydrogenated amorphous silicon carbide.

In FIG. 9, as the composition Y increases, the refractive index n increases. For example, if the composition Y is 0.33, the refractive index n is 1.8. If the composition Y is 0.78, the refractive index n is 2.7.

As shown in FIG. 8, the composition of the layer $l_1$ is a−Si$_{0.33}$C$_{0.67}$:H, and the composition of the layer $l_2$ is a−Si$_{0.78}$C$_{0.22}$:H in the dielectric mirror layer 74. The thickness of each of the layers $l_1$ and $l_2$ is made about 50 nm to 100 nm. The layers $l_1$ and $l_2$ are alternatively layered by seventeen layers. Thus, the total thickness of the dielectric mirror layer 74 is made about 1.3 μm.

(E) Each of the orientation films 15a and 15b is made of polyamide film which is formed by means of the spin coating technique and is applied with a molecular orientation process by means of a rubbing technique.

(F) The glass substrate 71a, on which the transparent electrode 72a and the orientation film 15a are formed, and the glass substrate 71b, on which the transparent electrode 72b, the photoconductive layer 73, the light absorbing layer 78, the dielectric mirror layer 74 and the orientation film 75b are formed, are attached together by use of the sealing member 76 as shown in FIG. 7. The distance between the orientation films 75a and 75b is made about 6 μm by the sealing member 76 which serves as a spacer.

(G) The liquid crystal layer 77 is formed by pouring and sealing composite nematic liquid crystal between the orientation films 75a and 75b. The composite nematic liquid crystal is, for example, made by adding chiral material (S811: made by Merck Co., Inc.) by about 10 weight % to nematic liquid crystal in phenyl-cyclohexanone family.

According to the above mentioned manufacturing procedure, at the step (D), the composition of the hydrogenated amorphous silicon carbide forming the dielectric mirror layer 73 is controlled by changing the gas flow volume ratio CH$_4$/(SiH$_4$+CH$_4$) of those material gases. Consequently, between the forming process of the layer $l_1$ and the forming process of the layer $l_2$, there is no need to change the material gases but only to change the gas flow volume ratio of the material gases so as to obtain the layers $l_1$ and $l_2$ having desired compositions.

Accordingly, the forming process of the dielectric mirror layer 74 in the present embodiment is quite simplified compared with the case of forming the dielectric mirror layer having layers made of different material gases. For example, in case of alternatively forming a ZnS layer and a MaF layer as the dielectric mirror layer, it is required to change the material gases for each layer forming process.

As a material gas of carbon for forming the hydrogenated amorphous silicon carbide layer as the dielectric mirror layer 74, ethane, propane, butane, acetylene and so on, can be used other than the methane.

As a method of forming each layer $l_1$ and $l_2$ of the dielectric mirror layer 74, the sputtering method, the heat CVD method, the light CVD method, ECR plasma method etc., can be utilized other than the plasma CVD method.

The dielectric mirror layer 74 may be formed to include other materials such as oxigen and nitrogen.

The molar composition Y of the silicon in the hydrogenated amorphous silicon carbide (a−Si$_y$C$_{1-y}$:H) can be selected within a range of 0.1 to 0.9 and the molar composition X of the carbon in the hydrogenated amorphous silicon carbide (a−Si$_{1-x}$C$_x$:H) can be selected within a range of 0.1 to 0.9 so that the refractive index n of the dielectric mirror layer 74 can be desirably selected. In view of stacking a high refractive index layer and a low refractive index layer, it is desirable that the molar composition Y is within a range of 0.1 to 0.5 and in a range of 0.7 to 0.9, while the molar composition X is within a range of 0.1 to 0.3 and 0.5 to 0.9.

In the display device 70, the number of layers $l_1$ and $l_2$ of the dielectric mirror layer 74 is not limited to seventeen, but it is preferably not less than ten, and more preferably not less than fifteen.

Figure 10:
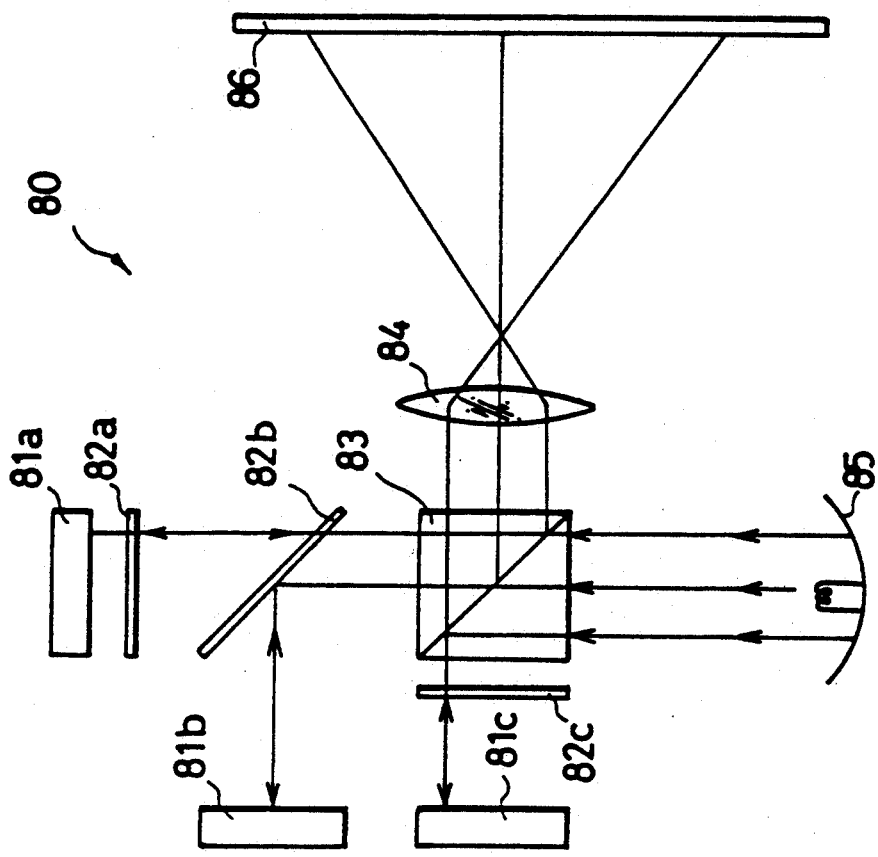
FIG. 10 is a schematic plan view showing a sixth embodiment of the present invention.

FIG. 10 shows a liquid crystal display apparatus, as a sixth embodiment of the present invention, utilizing three light valves each of which is same as the above described display device 70 of the fifth embodiment.

In FIG. 10, the liquid crystal display apparatus 80 of color projection type is provided with three light valves 81a, 81b and 81c, each of which is same as the display device 70 of FIG. 7. The light valves 81a, 81b and 81c are for R (red color), G (green color) and B (blue color), respectively.

In the operation of the display apparatus 80, the light from the light source 85 is split into three colors of R,G,B by the prism 83 and the dichroic mirrors 82a, 82b and 82c. Then, the split lights are transmitted through the light valves 81a,81b,81c, respectively, and combined together again by the prism 83. The combined light is then projected onto the screen 86 through the lens 84.

Each of the light valves 81a,81b,81c is manufactured in the same manner as the display device 70 as described before, but the reflection coefficient characteristics of the wave length spectrum of the dielectric mirror layer in each light valve 81a,81b,81c are made different from each other so as to have each spectrum the same as each corresponding R,G,B spectrum of the light source 85, respectively. Thus, the spectrum range, to which the dielectric mirror layer in each light valve 81a,81b,81c. is required to exhibit a high reflection coefficient, is made narrow. This leads to a reduction in the thickness of the dielectric mirror layer. For example, in order to achieve a high reflection coefficient over the whole spectrum range of visible ray (400 nm to 700 nm), the thickness of the dielectric mirror layer is required to be about 1.3 $\mu$m thick as in the case mentioned in the display device 70. However, if the spectrum range is limited between 500 nm and 600 nm, the thickness of the dielectric layer can be reduced to about 0.5 $\mu$m to 0.8 $\mu$m. Thus, it is possible to increase the reflection coefficient of the dielectric mirror layer without reducing the electric voltage applied to the liquid crystal layer.

As described above, the display apparatus 80 can be constructed with the light valves 81a,81b,81c suitable for color projection.

Figure 11:
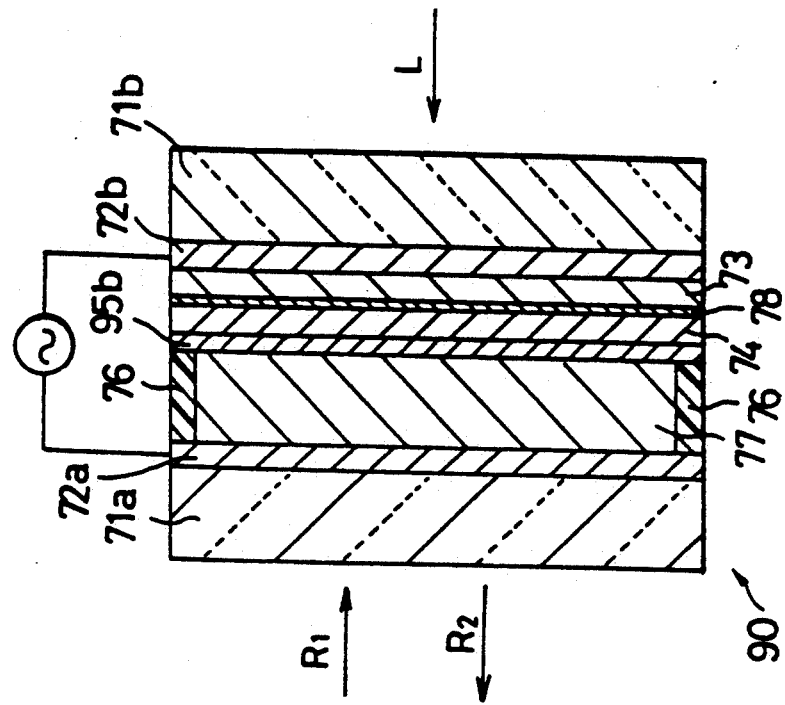
FIG. 11 is a schematic cross sectional view showing a seventh embodiment of the present invention.

FIG. 11 shows a display device of a seventh embodiment according to the present invention. In FIG. 11, the same elements as those in FIG. 7 carry the same reference numerals and the explanations thereof are omitted.

In FIG. 11, a liquid crystal display device 90 of light scattering mode as its display mode is provided with a liquid crystal composite film 95b. Instead, the display device 90 is not provided with the orientation films which are provided in the display device 70.

The manufacturing procedure of the display device 90 is same as that of the display device 70 to its step (D). In the seventh embodiment, after forming the dielectric mirror layer 74, the following process is performed to form the composite film 95b.

Namely, a homogeneous solution, in which about 30 weight % of a (i.e. involving two functional groups) acrylate (made by Nippon Kayaku Co., Ltd.) which is a UV polymarization compound, about 70 weight % of a nematic liquid crystal (ZLI 3201 000' made by Merck Co., Inc.), and a small amount of polymarization initiator (Darocure 1173' made by Merck Co., Inc.) are mixed together, the matrix being prepared and then filtered. Next, this prepared solution is spinner-coated on the dielectric mirror layer to a thickness of about 10 $\mu$m. The coated film is then exposed by an ultraviolet ray to obtain the composite film 95b.

Then, the glass substrate 71a, on which the transparent electrode 72a is formed, and the glass substrate 71b, on which the transparent electrode 72b, the photoconductive layer 73, the light absorbing layer 78, the dielectric mirror layer 74 and the composite film 95b are formed, are attached together by use of the sealing member 76 and the liquid crystal layer 77 is formed therebetween.

In the operation of the display device 90 as a light valve, an alternating electrical voltage is applied across the transparent electrodes 72a and 72b. Then, a laser beam L scans the substrate 71b so as to change the impedance of the photoconductive layer 73, change the voltage applied to the liquid crystal layer 77, and change each molecular orientation in the voltage applied area of the liquid crystal layer 77 to a specific direction so as to transmit a reading light $R_1$ therethrough. In the area of the liquid crystal layer 77 where the voltage is not applied, the molecular orientation directions are at random so as to scatter the light $R_1$ without transmitting the light $R_1$. Thus, an image due to the impedance differences is achieved on the liquid crystal layer 77, depending on the condition of the photoconductive layer 77 which is in either the dark condition or the bright condition.

Then, the light $R_1$ transmitted through the liquid crystal layer 77 is reflected by the dielectric mirror layer 74 as a reflected reading light $R_2$. The light $R_2$ is then outputted from the display device 10 to be projected onto a screen.

As described above, the seventh embodiment can be operated in the dynamic scattering mode.

In the above described first to seventh embodiments, the nematic liquid crystal is used as the liquid crystal; however, this is not mandatory. Instead, the present embodiment can utilize smectic liquid crystal or ferroelectric liquid crystal.

In case that the nematic liquid crystal is used, a field induced birefringence mode, the dynamic scattering mode, the HFE mode, the GH mode, the phase transition mode, and the TN mode can be utilized as the display mode.

In case that the smectic liquid crystal is used as the liquid crystal, the birefringence mode, the GH mode and the light scattering mode can be utilized as the display mode.

Many widely different embodiments of the present invention may be constructed without departing from the spirit and scope of the present invention. It should be understood that the present invention is not limited to the specific embodiments described in this specification; except as defined in the appended claims.

What is claimed is:

1. A liquid crystal display device of optical writing type comprising:
    a first transparent substrate;
    a first transparent electrode formed on said first transparent substrate;
    a photoconductive layer formed on said first transparent electrode and essentially consisting of hydrogenated amorphous silicon carbide (a—Si$_{1-x}$C$_x$:H) wherein x is in a range of 0.05 to 0.5;

a dielectric mirror layer formed on said photoconductive layer, said dielectric mirror layer having a multiple layer structure;

a second transparent substrate;

a second transparent electrode formed on said second transparent substrate;

a first orientation film formed on said dielectric mirror layer;

a second orientation film formed on said second transparent electrode; and a liquid crystal layer disposed between said first and second orientation films.

2. A liquid crystal display device according to claim 1, wherein x has a value such that impedances in dark and light conditions of said photoconductive layer are set to predetermined values corresponding to the impedance of said liquid crystal layer.

3. A liquid crystal display device according to claim 1 in which x has a value such that impedances in dark and bright conditions of said photoconductive layer are set to predetermined values corresponding to impedance of said liquid crystal layer.

4. A liquid crystal display device of optical writing type comprising:

a first transparent substrate;

a first transparent electrode formed on said first transparent substrate;

a photoconductive layer formed on said first transparent electrode;

a light absorbing layer formed on said photoconductive layer;

a dielectric mirror layer formed on said light absorbing layer;

a second transparent substrate;

a second transparent electrode formed on said second transparent substrate; and a liquid crystal layer disposed between said dielectric mirror layer and said second transparent electrode, wherein said dielectric mirror layer comprises a plurality of first dielectric layers including hydrogenated amorphous silicon carbide and a plurality of second dielectric layers including hydrogenated amorphous silicon carbide, said first and second dielectric layers being alternatively layered, the carbon content of said first dielectric layer and the carbon content of said second dielectric layer being different from each other, so as to provide a predetermined reflection index to said dielectric mirror layer.

5. A liquid crystal display device according to claim 4, wherein said photoconductive layer comprises hydrogenated amorphous silicon (a—Si:H).

6. A liquid crystal display device according to claim 4, wherein said light absorbing layer comprises amorphous silicon.

7. A liquid crystal display device according to claim 4 further comprising a first orientation film formed on said dielectric mirror layer, and a second orientation film formed on said second transparent electrode, said liquid crystal layer being disposed between said first and second orientation films.

8. A liquid crystal display device of optical writing type comprising:

a first transparent substrate;

a first transparent electrode formed on said first transparent substrate;

a photoconductive layer formed on said first transparent electrode and comprising amorphous silicon;

a light absorbing layer formed on said photoconductive layer;

a dielectric mirror layer formed on said light absorbing layer;

a second transparent substrate;

a second transparent electrode formed on said second transparent substrate; and a polymer dispersed liquid crystal layer disposed between said dielectric mirror layer and said second transparent electrode;

wherein said dielectric mirror layer comprises a plurality of first dielectric layers including hydrogenated amorphous silicon carbide and a plurality of second dielectric layers including hydrogenated amorphous silicon carbide, said first and second dielectric layers being alternatively layered, the carbon content of said first dielectric layer and the carbon content of said second dielectric layer being different from each other.

9. A liquid crystal display device of optical writing type according to claim 8 in which said photoconductive layer comprises hydrogenated amorphous silicon (a—Si:H).

10. A liquid crystal display device of optical writing type according to claim 8 in which said light absorbing layer comprises hydrogenated amorphous silicon tin (a—SiSn:H).

11. A method of manufacturing a liquid crystal display device, including the steps of:

forming a first transparent electrode on a first transparent substrate;

forming a photoconductive layer essentially consisting of hydrogenated amorphous silicon carbide (a—Si$_{1-x}$C$_x$:H) wherein x is in a range of 0.05 to 0.5 on said first transparent electrode, by means of one method selected from the group consisting of a CVD method, a plasm CVD method, a sputtering method, and a vacuum deposition method;

forming a dielectric mirror layer on said photoconductive layer;

forming a second transparent electrode on a second transparent substrate;

forming a first orientation film on said dielectric mirror layer;

forming a second orientation film on said second transparent electrode;

forming a liquid crystal layer disposed between said first and second orientation films.

12. A method of manufacturing a liquid crystal display device according to claim 11, wherein said photoconductive layer is formed from a gas material including silane (SiH$_4$), hydrogen (H$_2$), and methane (CH$_4$).

13. A method of manufacturing a liquid crystal display device according to claim 12, wherein the impedances in the dark and bright conditions are set to desired values by controlling a gas flow volume ratio of said gas material.

14. A method of manufacturing a liquid crystal display device, including the steps of:

forming a first transparent electrode on a first transparent substrate;

forming a photoconductive layer on said first transparent electrode essentially consisting of hydrogenated amorphous silicon carbide (a—Si$_{1-x}$C$_x$H) wherein x is in a range of 0.05 to 0.5;

forming a light absorbing layer on said photoconductive layer;

forming a plurality of first and second first and second dielectric mirror layers alternatively on said light absorbing layer, by means of one method selected from the group consisting of a CVD method, a plasma CVD method, a sputtering method, and a vacuum deposition method;

forming a second transparent electrode on a second transparent substrate;

forming a first orientation film formed on said plurality of first and second dielectric mirror layers, forming a second orientation film formed on said second transparent electrode; and forming a liquid crystal layer disposed between said first and second orientation films.

15. A method of manufacturing a liquid crystal display device according to claim 14 wherein said first and second dielectric layers are formed from a gas material including silane ($SiH_4$), hydrogen ($H_2$), and methane ($CH_4$).

16. A method of manufacturing a liquid crystal display device, including the steps of;

forming a first transparent electrode on a first transparent substrate;

forming a photoconductive layer comprising amorphous silicon on said first transparent electrode;

forming a light absorbing layer comprising hydrogenated amorphous silicon tin (a−SiSn:H) on said photoconductive layer;

forming a dielectric mirror layer comprising a plurality of first dielectric layers including hydrogenated amorphous silicon carbide and a plurality of second dielectric layers including hydrogenated amorphous silicon carbide, said first and second dielectric layers being alternatively layered, the carbon content of said first dielectric layer and the carbon content of said second dielectric layer being different from so as to provide a predetermined reflection index to said dielectric mirror layer on said light absorbing layer, forming a second transparent electrode on a second transparent substrate;

wherein said steps of forming said photoconductive layer, said light absorbing layer and said dielectric mirror layer are performed by the same one method selected from the group consisting of a CVD method, a plasma CVD method, a sputtering method, and a vacuum deposition method.

17. A method of manufacturing a liquid crystal display device according to claim 16, wherein said light absorbing layer is formed from a gas material including silane ($SiH_4$) and tetramethyltin ($Sn(CH_3)_4$).

18. A method of manufacturing a liquid crystal display device according to claim 17, further including the step of setting the light absorbing ability of said light absorbing layer to a desired value by controlling a gas flow volume ratio of said gas material.

* * * * *